United States Patent
Imoto

(10) Patent No.: US 9,172,848 B2
(45) Date of Patent: Oct. 27, 2015

(54) IMAGE READER FOR CORRECTING AN IMAGE

(71) Applicant: FUJI XEROX CO., LTD., Tokyo (JP)

(72) Inventor: Yoshiya Imoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/492,702

(22) Filed: Sep. 22, 2014

(65) Prior Publication Data

US 2015/0249772 A1    Sep. 3, 2015

(30) Foreign Application Priority Data

Feb. 28, 2014 (JP) ................. 2014-038717

(51) Int. Cl.
*G03F 3/08* (2006.01)
*H04N 1/60* (2006.01)
*H04N 1/028* (2006.01)

(52) U.S. Cl.
CPC ........... *H04N 1/6027* (2013.01); *H04N 1/0289* (2013.01); *H04N 1/02895* (2013.01); *H04N 1/6005* (2013.01)

(58) Field of Classification Search
CPC .............. H04N 1/6027; H04N 1/6005; H04N 1/02895; H04N 1/0289
USPC ........................................... 358/518–520, 1.9
See application file for complete search history.

(56) References Cited

U.S. PATENT DOCUMENTS

RE39,712 E * 7/2007 Vogel ......................... 348/222.1
8,134,900 B2 * 3/2012 Sagara et al. ............... 369/59.12

FOREIGN PATENT DOCUMENTS

| JP | A-10-200708 | 7/1998 |
| JP | A-2000-307806 | 11/2000 |
| JP | A-2005-198200 | 7/2005 |

* cited by examiner

*Primary Examiner* — Douglas Tran
(74) *Attorney, Agent, or Firm* — Oliff PLC

(57) ABSTRACT

Provided is an image reader, including a reading unit that reads an image of a read body, an optical unit that forms the image of the read body on the reading unit, a filter unit that is disposed in the optical unit and eliminates infrared light by an interference film, a calculating unit that calculates a coefficient matrix during a color correction based on a reading position of the reading unit and spectral field angle characteristics of the filter unit in the reading position, and a correction unit that performs the color correction with respect to the image read by the reading unit using the coefficient matrix.

3 Claims, 5 Drawing Sheets

IMAGE READER FOR CORRECTING AN IMAGE

CROSS-REFERENCE TO RELATED APPLICATIONS

This application is based on and claims priority under 35 USC 119 from Japanese Patent Application No. 2014-038717 filed Feb. 28, 2014.

BACKGROUND (i) Technical Field

The present invention relates to an image reader, and a non-transitory computer readable medium storing image reading program.

(ii) Related Art

In general, in an image reader for reading a color image, a read body is irradiated with light, and reflected light or transmitted light is received by a light receiving element and is output as a signal of each color component. On an optical path to the light receiving element from the read body, an optical system such as a lens which forms an image on the light receiving element is disposed.

Light receiving characteristics of the light receiving element receives light of up to a wavelength longer than a wavelength band at the time of being observed by naked eyes, and when light of a wavelength which is invisible for the naked eyes is received and a signal is output, a color which is visible for the naked eyes and a color which is indicated by the signal output from the light receiving element are separated from each other. For example, spectral characteristics of a used light source are generated in various cases such as a case where light is emitted up to a wavelength band which is invisible for the naked eyes, or a case where a colorant used in an image forming apparatus absorbs light in a wavelength band which is visible for the naked eyes but reflects light in the wavelength band which is not visible for the naked eyes. In addition, spectral transmission characteristics of a blue (B) color and a green (G) color among color filters for performing a three-color separation on the light receiving element have characteristics of transmitting a 700 nm or greater infrared region, and thus there may be turbidity in a read color.

In a case of the filter for eliminating the infrared light by the interference film, the spectral characteristics are changed according to an incident angle. Then, light passing through an optical axis, and light passing through a position separated from the optical axis have different spectral characteristics, and thus there is a difference in the read color. In addition, recently, a white color light-emitting diode (hereinafter, referred to as a "white color LED") is used as the light source. Emitted light of the white color LED has spectral characteristics different from the xenon lamp, and a change of the spectral characteristics according to the incident angle may affect the read color.

In addition, there is a trend in which a spectral frequency band of an R component extends to a short wavelength side according to needs for high sensitivity of the light receiving element. Accordingly, a half value wavelength of the R component is shorter than a half value wavelength of a red colorant, and for example, there is a trend in which a spectral distribution of the R component at the time of reading an achromatic color and a spectral distribution of the R component at the time of reading a red color are separated from each other.

FIGS. 5A and 5B are explanatory views of an example of the spectral distributions of the R component at the time of reading the achromatic color and the red color. In FIG. 5A, as the spectral distribution of the R component at the time of reading the achromatic color, a solid line indicates the spectral distribution in the optical axis, and a broken line indicates the spectral distribution in the position separated from the optical axis. In addition, in FIG. 5B, as the spectral distribution of the R component at the time of reading the red color, a solid line indicates the spectral distribution in the optical axis, and a broken line indicates the spectral distribution in the position separated from the optical axis. In any case, a portion which is indicated by a hatched line is a portion in which the spectral characteristics are changed according to the incident angle by the filter for eliminating the infrared light by the interference film. An output value of a signal of the R component corresponds to an area of the spectral distribution thereof.

In general, a shading correction for correcting a limb darkening of the lens or the like is performed based on an output value of each color component at the time of reading the achromatic color. By an output value W (an area of the spectral distribution) at the time of reading the achromatic color illustrated in FIG. 5A, an output value R (an area of the spectral distribution) at the time of reading the red color illustrated in FIG. 5B is normalized, and R/W is considered. An output value of the R component at the time of reading the achromatic color in the optical axis is set to Wc, an output value of the R component at the time of reading the red color is set to Rc, and Rc/Wc is considered as a normalized value. In addition, an output value of the R component at the time of reading the achromatic color in the position separated from the optical axis is set to Wt, an output value of the R component at the time of reading the red color is set to Rt, and Rt/Wt is considered as a normalized value. Here, when a change of the value according to a change of the spectral characteristics of the filter which is indicated by the hatched line in FIGS. 5A and 5B is set to S1, and it is assumed that the changed values S1 at the time of reading the achromatic color and at the time of reading the red color are identical to each other, Wt may be approximated by (Wc−S1), and Rt may be approximated by (Rc−S1). Here, when Rc/Wc and (Rc−S1)/(Wc−S1) are compared to each other, an influence of the changed value S1 decreases as a value of a fraction thereof becomes closer to 1, but a difference between the values of both of the fractions according to the changed value S1 increases as the value of the fraction becomes smaller. As described above, the value of the fraction decreases along with the increasing spectral sensitivity width of the light receiving element, and thus the influence according to the change of the spectral characteristics of the filter appears. A decrease in Rc/Wc indicates a decrease in color saturation of the read value of the red color. Furthermore, a color turbidity correction amplifies the difference of color saturation, and thus a read color saturation characteristic difference according to the incident angle is emphasized.

SUMMARY

According to an aspect of the invention, there is provided an image reader, including:
a reading unit that reads an image of a read body;
an optical unit that forms the image of the read body on the reading unit;
a filter unit that is disposed in the optical unit and eliminates infrared light by an interference film;

a calculating unit that calculates a coefficient matrix during a color correction based on a reading position of the reading unit and spectral field angle characteristics of the filter unit in the reading position; and a correction unit that performs the color correction with respect to the image read by the reading unit using the coefficient matrix.

BRIEF DESCRIPTION OF THE DRAWINGS

Exemplary embodiments of the present invention will be described in detail based on the following figures, wherein.

DETAILED DESCRIPTION

Figure 1A:
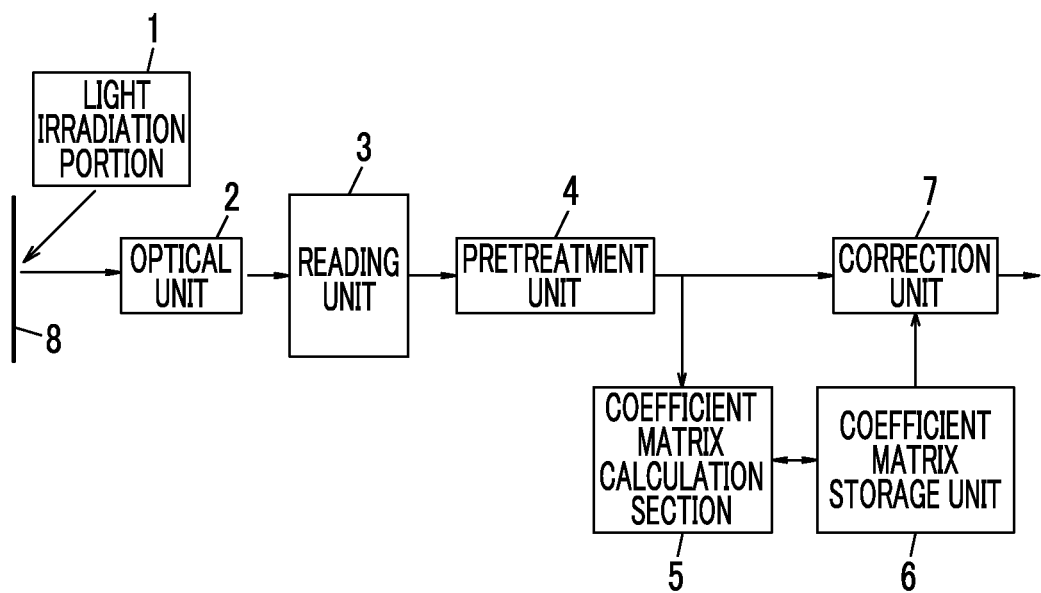
FIGS. 1A and 1B are configuration diagrams for illustrating an exemplary embodiment of the invention.
Figure 1B:
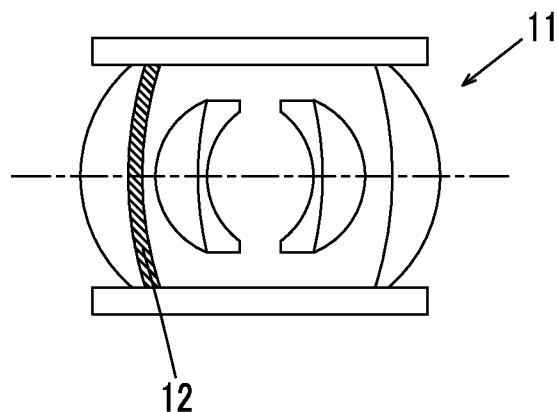

FIGS. 1A and 1B are configuration diagrams illustrating an exemplary embodiment of the invention. In FIGS. 1A and 1B, "1" is a light irradiation portion, "2" is an optical unit, "3" is a reading unit, "4" is a pretreatment unit, "5" is a coefficient matrix calculating section, "6" is a coefficient matrix storage unit, "7" is a correction unit, "8" is a read body, "11" is an imaging lens, and "12" is an interference film filter.

The light irradiation portion 1 irradiates the read body 8 with light. For example, plural white color LEDs may be used as a light source. Other configurations, for example, an optical element or the like such as a light guide plate or a diffusion plate, may be included.

The optical unit 2 forms an image of the read body 8 on the reading unit 3. In FIG. 1B, an example of the optical unit 2 is illustrated. The imaging lens 11 configured by one or more lens groups, and the interference film filter 12 formed on one surface of the lens which configures the imaging lens 11 are included. The interference film filter 12 forms an interference film by laminating plural films of different refractive indexes on the surface of the lens, and eliminates infrared light by the interference film.

The reading unit 3 receives light, for example, reflected light or transmitted light from the read body 8, converts the light into an electrical signal, and reads a color image of the read body 8. The optical unit 2 forms the image of the read body 8, and the reading unit reads the color image by the image formation. The reading unit may be configured by a known color image sensor. As described later, the reading method is not limited.

The pretreatment unit 4 performs several processes with respect to the color image read by the reading unit 3 before performing a correction process by the correction unit 7. For example, a black level adjustment, a shading correction, and other various processes are included. Of course, when there is no necessity for a process, the pretreatment unit 4 may not be disposed.

The coefficient matrix calculating section 5 calculates a coefficient matrix used at the time of performing the color correction by the correction unit 7 based on a reading position in the reading unit 3, and spectral field angle characteristics of the interference film filter 12 in the reading position. At this time, further, the coefficient matrix may be calculated by using a value of a signal of each color component at the time of reading a reference color plate as the read body 8 by the reading unit 3. At the time of using the white color LED using a light-emitting device of a blue color and a fluorescence body as a light source of the light irradiation portion 1, when the coefficient matrix is calculated by using a yellow color as a reference color, by using a blue (B) component obtained by reading a reference color plate of the yellow color, or by further using a G component and an R component, the coefficient matrix corresponding to the color correction with respect to an irregularity of a peak wavelength of the light-emitting device of the blue color used in the white color LED and an irregularity of a ratio between the light-emitting device of the blue color and the fluorescence body is obtained.

A formula used at the time of calculating the coefficient matrix may be calculated by a linear formula using the coefficient matrix as a base. In addition, the coefficient matrix is calculated for each reading position of the reading unit 3, but for example, the corresponding coefficient matrix may be calculated for each read pixel disposed in the reading unit 3 or for several read pixels as a unit.

The coefficient matrix storage unit 6 stores the coefficient matrix calculated for each reading position in the reading unit 3 by the coefficient matrix calculating section 5. In addition, when the coefficient matrix which is the base at the time of calculating the coefficient matrix by the coefficient matrix calculating section 5 is used, the coefficient matrix as the base may be stored.

The correction unit 7 performs a process of the color correction with respect to the image read by the reading unit 3 by using the coefficient matrix which is calculated by the coefficient matrix calculating section 5, and for example, is stored in the coefficient matrix storage unit 6. In the process of the color correction using the coefficient matrix, a change of the color which occurs by changing the spectral characteristics according to a difference of an incident angle on the interference film filter 12 for eliminating the infrared light by the reading position of the reading unit 3 is corrected. Alternatively, the color correction may be further performed with respect to an irregularity of the used light source based on a read result of the reference color with respect to the reading position.

Figure 2A:
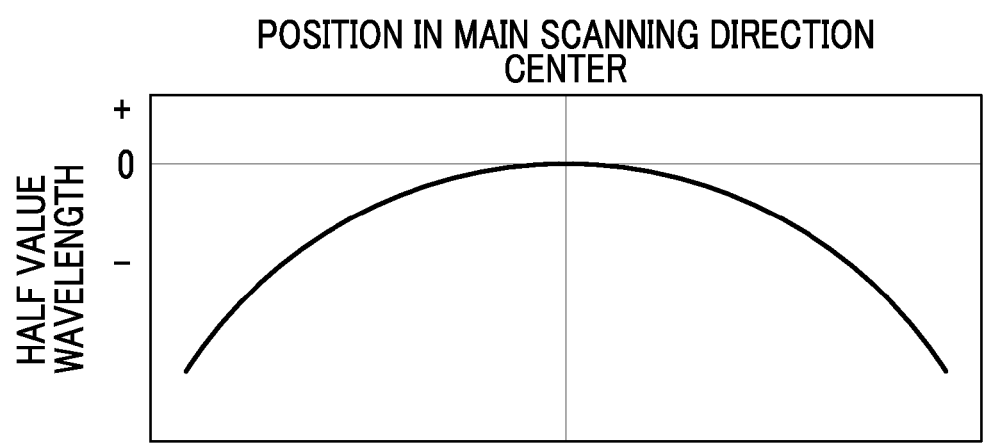
FIGS. 2A and 2B are explanatory views of an example of a relationship between a reading position of a reading unit and a half value wavelength shift amount of an interference film filter.
Figure 2B:
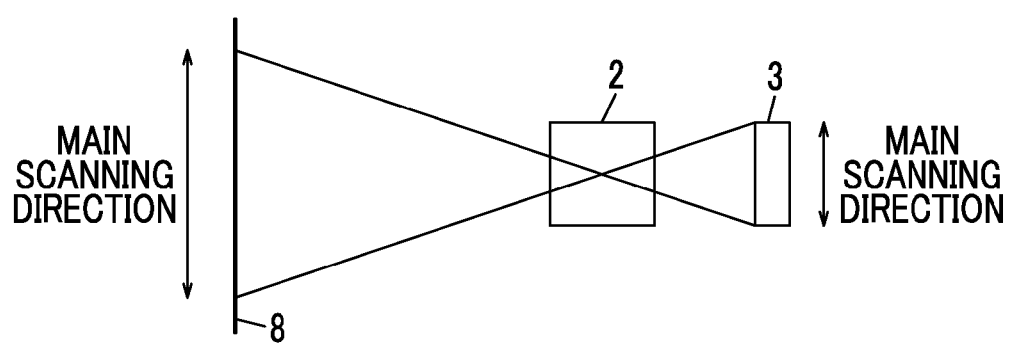

The above configuration will be further described. FIGS. 2A and 2B are explanatory views of an example of a relationship between the reading position of the reading unit 3 and a half value wavelength shift amount of the interference film filter 12. Here, as illustrated in FIG. 2B, when the reading unit 3 is a line sensor, an extending direction of the line sensor, for example, an arrangement direction of the light receiving element or the like, is a main scanning direction. The optical unit 2 forms an image of one line in the main scanning direction of the read body 8 on the reading unit 3, and the image is read.

When the position is displaced from a center (an optical axis) position in the main scanning direction, an angle of a light flux focusing on the position is changed, and an angle of the light flux at the time of being incident on the interference film filter 12 is also different. According to the difference of the incident angle, a wavelength of light transmitting the interference film filter 12 is changed. Herein, characteristics indicating how a certain kind of wavelength light is transmitted with respect to the incident angle is referred to as "spectral field angle characteristics".

In an example of the relationship between the reading position of the reading unit 3 and the half value wavelength shift amount of the interference film filter 12 illustrated in FIG. 2A, how the half value wavelength is changed by the interference film filter 12 in each position in the main scanning direction is illustrated. Here, a displacement amount from the half value wavelength in the center of the reading position is illustrated. As described above, when the reading position of the reading unit 3 is different, the incident angle on the interference film filter 12 is different, and the spectral field angle characteristics are also different. Here, as one index indicating the spectral field angle characteristic, the half value wavelength is illustrated.

Figure 5A:
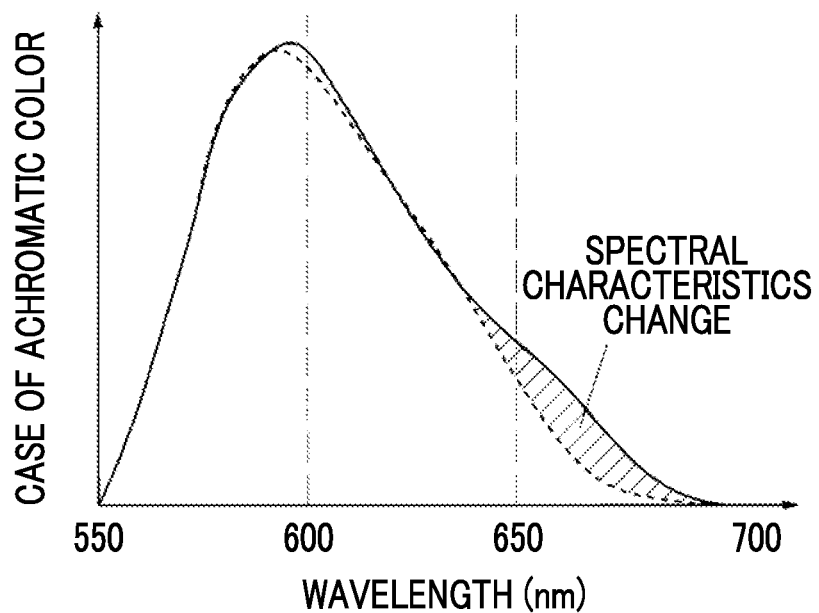
FIGS. 5A and 5B are explanatory views of an example of a spectral distribution of an R component at the time of reading an achromatic color and a red color.
Figure 5B:
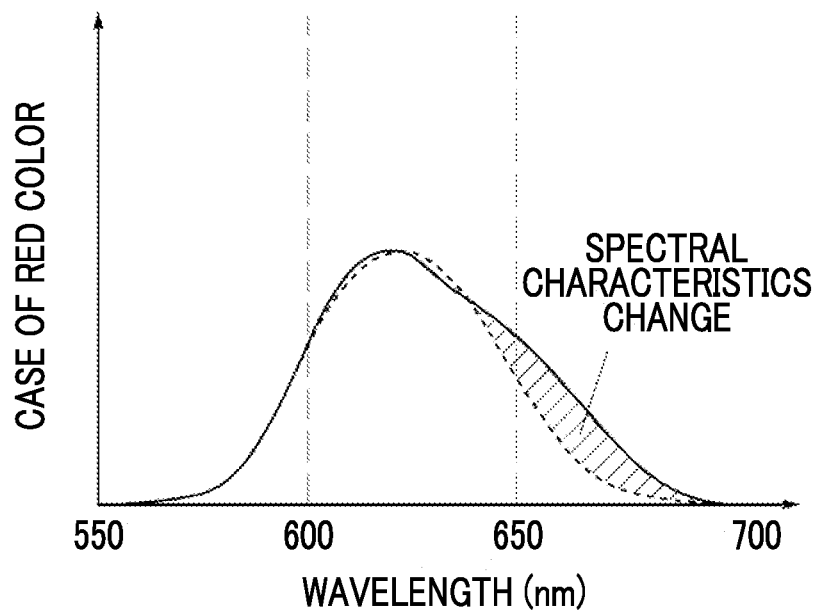

In an example illustrated in FIG. 2A, the half value wavelength of the interference film filter 12 is separated from the center (the optical axis) position, and thus is displaced to a minus side, that is, to a side in which the half value wavelength becomes shorter. The displacement is described in FIGS. 5A and 5B, and a case where the output value of the R component decreases for the displacement of the half value wavelength is illustrated. The difference of the output value of the R component affects the entire color space, and thus in this exemplary embodiment, the correction process is performed with respect to the entire color space by using a matrix.

Here, as an example of the correction process performed by the correction unit 7, a case where a correction process accompanying a color space conversion by the following conversion equation is performed is considered. Here, the image signal output from the reading unit 3, or the image signal after performing a pre treatment at the time of performing the pre treatment by the pretreatment unit 4 is configured by color signals of a red (R) component, a green (G) component, and a blue (B) component, and hereinafter, each color signal is indicated by R, G, and B. In addition, in this example, the color signals of R, G, and B are converted into color signals (here, L, a, and b) of a CIELAB color space. Furthermore, the following conversion equation is used up to a secondary section.

$$\begin{pmatrix} L \\ a \\ b \end{pmatrix} = \begin{pmatrix} c_{10} & c_{11} & c_{12} & c_{13} & c_{14} & c_{15} & c_{16} & c_{17} & c_{18} & c_{19} \\ c_{20} & c_{21} & c_{22} & c_{23} & c_{24} & c_{25} & c_{26} & c_{27} & c_{28} & c_{29} \\ c_{30} & c_{31} & c_{32} & c_{33} & c_{34} & c_{35} & c_{36} & c_{37} & c_{38} & c_{39} \end{pmatrix} \cdot$$ [Formula 1]

$$\begin{pmatrix} 1 \\ B^{1/3} \\ G^{1/3} \\ R^{1/3} \\ G^{1/3} \cdot R^{1/3} \\ R^{1/3} \cdot B^{1/3} \\ B^{1/3} \cdot G^{1/3} \\ B^{2/3} \\ G^{2/3} \\ R^{2/3} \end{pmatrix}$$

Here, a coefficient matrix of 3×10 is used, and the coefficient matrix is set to C.

As a coefficient $c_{ij}$ (i=1, ..., and 3, j=0, ..., and 9) of the coefficient matrix C, a coefficient of the coefficient matrix as the base is set to $co_{ij}$, an amount related to a wavelength displacement of the interference film filter 12 is set to $S_{ICF}$, and correction coefficients are set to $k1_{ij}$, $k2_{ij}$, and $k3_{ij}$, and thus the coefficient $c_{ij}$ of the coefficient matrix after the correction may be $$c_{ij}=co_{ij}+k1_{ij} \cdot S_{ICF}+k2_{ij} \cdot S_{ICF}^2+k3_{ij}.$$

Here, the equation is set up to a section proportional to the square of the amount $S_{ICF}$ related to the wavelength displacement of the interference film filter 12. Here, the correction coefficients $k1_{ij}$, $k2_{ij}$, and $k3_{ij}$ maybe set in advance such that the reading position of the reading unit 3 is $$k1_{ij} \cdot S_{ICF}+k2_{ij} \cdot S_{ICF}^2+k3_{ij}=0$$

in the center (the optical axis) position.

The amount $S_{ICF}$ related to the wavelength displacement of the interference film filter 12 may be obtained by $$S_{ICF}=f(x)$$

by setting a position in the main scanning direction of the reading unit 3 to x.

More specifically, the amount $S_{ICF}$ may be obtained by $$S_{ICF}=s_2 \cdot x^2+s_1 \cdot x+s_0$$

by approximating the relationship between the reading position of the reading unit 3 illustrated in FIG. 2A and the half value wavelength shift amount of the interference film filter 12 with a quadratic function, and by setting the position in the main scanning direction to x.

Furthermore, when the coefficient matrix described above is obtained for each pixel in the main scanning direction, each coefficient matrix may be calculated by using the amount $S_{ICF}$ related to the wavelength displacement according to the position where each of the pixels exists, and when the coefficient matrix is obtained for each region using several pixels as a unit, each coefficient matrix may be calculated by using the amount $S_{ICF}$ related to the wavelength displacement according to the position representing each region. Of course, the amount $S_{ICF}$ related to the wavelength displacement of the interference film filter 12 is not limited to this example, and may be calculated by using various functional relationships. For example, the amount $S_{ICF}$ may be a value which is added by a value according to a manufacturing error of the interference film filter 12. In addition, here, as the spectral field angle characteristics, the half value wavelength is used, but an index other than the index indicating the spectral field angle characteristics may be used.

In addition, for example, a wavelength displacement amount of the interference film filter 12 may be changed to actually perform reading, a read color and a color output by being read may be paired with each other to obtain the coefficient matrix as the color conversion characteristics, and the above correction coefficients $k1_{ij}$, $k2_{ij}$, and $k3_{ij}$ may be obtained from the wavelength displacement amount and a changing trend of each coefficient of the coefficient matrix.

In an example of the correction process described above, a case where the correction process accompanying the color space conversion from an RGB color space to the CIELAB color space is performed is illustrated. Of course, the correction process may be performed without being limited to the example, and for example, the correction process may be performed in the RGB color space. In this case, the correction process may be performed by $$\begin{pmatrix} B'_L \\ G'_L \\ R'_L \end{pmatrix} = \begin{pmatrix} c_{10} & c_{11} & c_{12} & c_{13} & c_{14} & c_{15} & c_{16} & c_{17} & c_{18} & c_{19} \\ c_{20} & c_{21} & c_{22} & c_{23} & c_{24} & c_{25} & c_{26} & c_{27} & c_{28} & c_{29} \\ c_{30} & c_{31} & c_{32} & c_{33} & c_{34} & c_{35} & c_{36} & c_{37} & c_{38} & c_{39} \end{pmatrix} \cdot$$ [Formula 2]

$$\begin{pmatrix} 1 \\ B_L \\ G_L \\ R_L \\ G_L \cdot R_L \\ R_L \cdot B_L \\ B_L \cdot G_L \\ B_L^2 \\ G_L^2 \\ R_L^2 \end{pmatrix}$$

by using $R_L$, $G_L$, and $B_L$ which are values of R, G, and B, respectively, to the power of ⅓, and R', G', and B', which are the obtained $R_L'$, $G_L'$, and $B_L'$, respectively to the power of 3, may be a correction result. The power of ⅓ and the power of 3 depend on including characteristics in which the RGB color space is proportional to the power of ⅓. For example, in an sRGB color space, a conversion using the coefficient matrix may be performed by a power of 1/2.2, and a power of 2.2 may be used. A case where a correction process to a color space other than the RGB color space, or a correction process from a color space other than the RGB color space is performed is included, and in any case, the correction process may be performed by using a modified coefficient matrix.

Thus, the coefficient matrix at the time of performing the color correction is calculated based on the reading position of the reading unit 3 and the spectral field angle characteristics of the interference film filter 12 in the reading position. The calculated coefficient matrix is stored in the coefficient matrix storage unit 6. Then, by using the calculated coefficient matrix after being modified, the correction unit 7 may perform the correction process which is indicated by Formulas 1 and 2 with respect to an image which is actually read by the reading unit 3. Since the color conversion is performed by the matrix, a necessary correction is performed with respect to the entire color space.

The process of the color correction indicated by Formulas 1 and 2 described above is not only the process of the color correction based on the spectral field angle characteristics of the interference film filter 12, for example, but also a process which is used at the time of performing a correction with respect to a color irregularity due to the irregularity of the light source used in the light irradiation portion 1. Accordingly, when the coefficient matrix which takes into account an item of the other color correction is obtained, the process of the color correction based on the spectral field angle characteristics of the interference film filter 12 and the process of the color correction based on the other item are performed at the same time.

For example, when the plural white color LEDs configured by the light-emitting device of the blue color and the fluorescence body of the yellow color are used as the light irradiation portion 1, a light-emitting intensity and an emission wavelength of the light-emitting device of the blue color, an intensity of the fluorescence emitted from the fluorescence body, or the like may respectively be different according to a manufacturing irregularity. The color correction related to a ratio of the light-emitting intensity of the light-emitting device of the blue color and the intensity of the fluorescence emitted by the fluorescence body, for example, is disclosed in JP-A-2013-243593 or the like. That is, when the ratio of the light-emitting intensity of the light-emitting device of the blue color and the intensity of the fluorescence emitted by the fluorescence body is different, the difference appears in an output value of the blue (B) component at the time of reading the yellow color, and thus the yellow color is set as the reference color, and the coefficient matrix may be calculated by using the output value of the B component at the time of reading the reference color by the reading unit 3.

When the correction process is performed by using Formula 1 described above, the coefficient $c_{ij}$ of the coefficient matrix is calculated by $$c_{ij} = co_{ij} + k1_{ij} \cdot S_{ICF} + k2_{ij} \cdot S_{ICF}^2 + k3_{ij} + k4_{ij} \cdot g(By)$$

by setting the value of the B component obtained by reading the yellow color which is the reference color to By, and by using the amount $S_{ICF}$ related to the wavelength displacement of the interference film filter 12 along with the value By. Since the change of the spectral field angle characteristics of the interference film filter 12 does not affect the output value of the B component, a section using the B component as an independent section may be added at the time of calculating the coefficient.

Here, g(By) may be the value By of the B component in itself, or may be a value calculated by a predetermined calculation based on the value By of the B component. By using a value Ry of the red (R) component and a value Gy of the green (G) component obtained by reading the yellow color which is the reference color, and by using the coefficients p1, p2, and p3, g(By) may be calculated by $$g(By) = By/(p1 \cdot Ry + p2 \cdot Gy + p3).$$

Of course, it is not limited to this example.

Further, regarding the color correction related to the irregularity of the emission wavelength of the light-emitting device of the blue color in the white color LED described above, the coefficient matrix may be calculated by using the value of the G component at the time of reading the blue color, a cyan color, or the yellow color described above as the reference color by the reading unit 3, and thus the color correction may be performed. The detailed description will be omitted, but an overlap of the spectral distribution of the light emitted from the light-emitting device of the blue color of the white color LED, and the spectral distribution of the G component of the reading unit 3 is changed according to the irregularity of the emission wavelength of the blue color. When the reference color of the blue color or the cyan color is read, a change appears in the output value of the G component according to the change. In addition, a component caused by the irregularity of the emission wavelength of the blue color is included in the G component at the time of reading the achromatic color as the reference color, and the process of the shading correction performed by the pretreatment unit 4 by using the read value includes the irregularity of the emission wavelength of the blue color. When the yellow color is read as the reference color, the light-emitting component emitted by the light-emitting device of the blue color is small compared to a main component of the G component, and thus is not reflected in the value, but an influence of blue color light appears in the value of the G component according to the shading correction.

Thus, when the blue color, the cyan color, or the yellow color is read by the reading unit 3 as the reference color, the irregularity of the emission wavelength of the light-emitting device of the blue color appears in the output value of the G component. Accordingly, the coefficient matrix may be calculated by using the value of the G component at the time of such a case, and thus the correction process may be performed.

When the correction process is performed by using Formula 1 described above, the coefficient $c_{ij}$ of the coefficient matrix is calculated by $$c_{ij}=co_{ij}+k1_{ij} \cdot S_{ICF}+k2_{ij} \cdot S_{ICF}^2+k3_{ij}+k4_{ij} \cdot g(By)+k5_{ij} \cdot h(Gy)$$

by reading the yellow color which is the reference color, by setting the value of the B component obtained by performing the shading correction to By, by setting the value of the G component obtained by performing the shading correction to Gy, and by using the amount $S_{ICF}$ related to the wavelength displacement of the interference film filter 12 along with the value By and the value Gy. Here, h(Gy) may be the value of the G component in itself, and may be a value calculated by a predetermined calculation based on the value Gy of the G component. The value of the G component sit the time of reading the yellow color as the reference color is determined by reflection of a main wavelength band, and thus the influence according to the change of the spectral field angle characteristics of the interference film filter 12 may not be considered, and here, a section using the value of the G component as an independent section at the time of calculating the coefficient is set.

Further, when the value of the G component which is obtained by reading the yellow color as the reference color and by performing the shading correction is used, an irregularity of the reference color which is the yellow color, for example, a thickness of a film of a coating material of the yellow color which is coated on the reference color plate, may affect a magnitude of the value of the G component. In order to prevent the influence according to the irregularity of the reference color which is the yellow color, the value of the R component affected by a reference color plate 25 of the yellow color may be used along with the G component. For example, the value of the G component may be used by normalizing using the value of the R component.

For example, the coefficient matrix may be calculated by reading the yellow color which is the reference color, by setting the value of the R component obtained by performing the shading correction to Ry, and by using a value (Gy/Ry) in which the value of the G component is normalized by the value of the R component. The coefficient of the coefficient matrix described above may be set to $$c_{ij}=co_{ij}+k1_{ij} \cdot S_{ICF}+k2_{ij} \cdot S_{ICF}^2+k3_{ij}+k4_{ij} \cdot g(By)+k5_{ij} \cdot h(Gy/Ry).$$

Further, according to spectral sensitivity characteristics of the G component, sensitivity may be included in a region in which the wavelength displacement of the interference film filter 12 occurs, and it is considered that the G component at the time of reading the reference color described above is affected by the irregularity of the emission wavelength of the light-emitting device of the blue color in the white color LED, and the wavelength displacement of the interference film filter 12. With consideration for the influence, a section considering a relationship between the value (Gy/Ry) in which the value of the G component is normalized by the value of the R component, and the amount $S_{ICF}$ related to the wavelength displacement of the interference film filter 12 described above may be set. For example, the coefficient of the coefficient matrix described above may be calculated by $$c_{ij}=co_{ij}+k1_{ij} \cdot S_{ICF}+k2_{ij} \cdot S_{ICF}^2+k3_{ij}+k4_{ij} \cdot g(By)+k5_{ij} \cdot h(Gy/Ry)+k6_{ij} \cdot S_{ICF} \cdot h(Gy/Ry).$$

The function h (Gy/Ry) may be the value of Gy/Ry in itself, and may be a value calculated by a predetermined calculation based on the value of Gy/Ry.

For example, the wavelength displacement amount of the interference film filter 12, the blue color emission wavelength of the white color LED, a ratio of the blue color light-emitting intensity and the fluorescence body light-emitting intensity, or the like may be respectively changed to actually perform the reading; the read color and the color output by being read may be paired with each other to obtain the coefficient matrix as the color conversion characteristics; and the correction coefficients $k1_{ij}$, $k2_{ij}$, $k3_{ij}$, $k4_{ij}$, and $k5_{ij}$, or in addition, $k6_{ij}$ may be obtained from each changed amount and the changing trend of each coefficient of the coefficient matrix.

Thus, the coefficient matrix, in which a color displacement according to the difference of the spectral field angle characteristics of the interference film filter 12, a color displacement according to the light-emitting irregularity of the white color LED used in the light irradiation portion 1, and the like are corrected at the same time, is obtained. When the correction process is performed by the correction unit 7 with the coefficient matrix, the influence according to the spectral field angle characteristics of the interference film filter 12 and the influence according to the light-emitting irregularity in the light irradiation portion 1 are corrected at the same time. In addition, by performing the color conversion using the matrix, a necessary correction is performed with respect to the entire color space.

Furthermore, the formula for obtaining the coefficient of the coefficient matrix described above is an example, and it is not limited to the example. In addition, in the example described above, a case where the correction is performed by considering the color displacement according to the difference of the spectral field angle characteristics of the interference film filter 12, and the influence according to the irregularity of the white color LED used in the light irradiation portion 1 is described, but it is not limited thereto, and the correction process may be performed by using the coefficient matrix by calculating the coefficient matrix which performs the correction with respect to various items requiring the color correction along with the color correction according to the difference of the spectral field angle characteristics of the interference film filter 12.

Figure 3A:
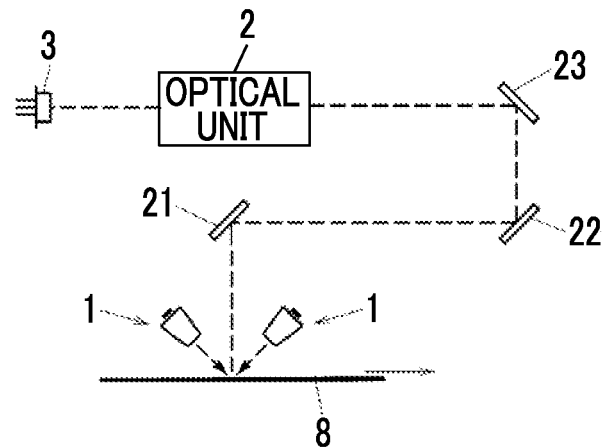
FIGS. 3A to 3C are explanatory views of an example of a reading method.
Figure 3B:
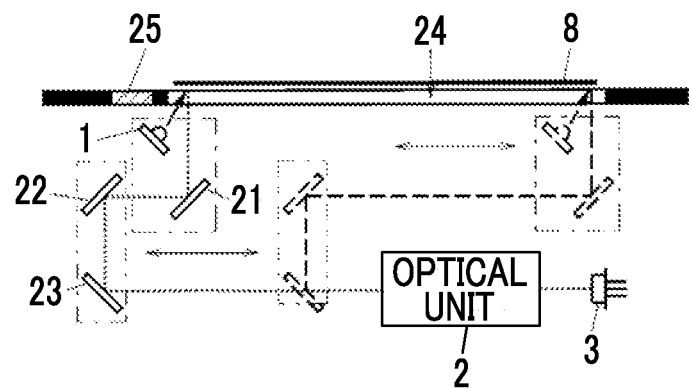
Figure 3C:
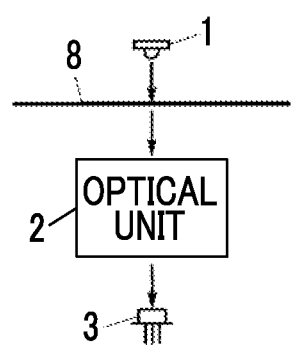

FIGS. 3A to 3C are explanatory views of an example of a reading method. In FIGS. 3A to 3C, "21", "22", and "23" indicate mirrors, "24" indicates an opening portion, and "25" indicates the reference color plate. In an example illustrated in FIGS. 1A and 1B, an operation of illuminating the read body 8 by the light irradiation portion 1, of forming the image of the read body 8 on the reading unit 3 by the optical unit 2, and of reading the image in the main scanning direction by the reading unit 3 is repeatedly performed while moving the read body 8, and thus a two-dimensional image is obtained. Of course, it is not limited to such a configuration, and several specific examples from various reading methods are illustrated in FIGS. 3A to 3O.

In an example illustrated in FIG. 3A, a configuration in which an optical path from the read body 8 to the reading unit 3 is changed by using the mirrors 21, 22, and 23 is illustrated as an example. Light is emitted from the light irradiation portion 1 to the read body 8, reflected light from the read body 8 is received by the reading unit 3 through the optical unit 2, and the image in the main scanning direction is read. The reading is repeatedly performed while moving the read body 8, and thus the two-dimensional image is obtained. Furthermore, when the reference color is read, for example, the reference color may be read in a state where the read body 8 does not exist by being disposed on a back surface of the read body 8, or the reference color may be read by preparing the read body 8 on which the reference color is placed.

In an example illustrated in FIG. 3B, an example in which the read body 8 is not moved, but the light irradiation portion 1 and the mirrors 21, 22, and 23 are moved to perform the reading is illustrated. In a case of this example, the reflected light of the light emitted from the light irradiation portion 1 is received by the reading unit 3 through the mirrors 21, 22, and 23 and the optical unit 2, and the image is read. At the time of performing the reading, the read body 8 is fixed to the opening portion 24, the light irradiation portion 1 and the mirror 21 are moved, and the reading is performed by the reading unit 3 while moving the mirror 22 and the mirror 23 at a velocity half of that of the light irradiation portion 1 and the mirror 21. In this example, when the reference color is read, the light irradiation portion 1 and the mirror 21 may be moved to a position where the reference color plate 25 is read, the mirror 22 and the mirror 23 may be moved by the distance half of that of the light irradiation portion 1 and the mirror 21, and the color of the reference color plate 25 may be read by the reading unit 3. Furthermore, a configuration combined with the functions of FIGS. 3A and 3B may be included.

Both FIGS. 3A and 3B are configurations in which the reflected light from the read body 8 is received by the reading unit 3, but, surely, a configuration in which the light transmitting the read body 8 is received by the reading unit 3 as illustrated in FIG. 3C may be included.

Figure 4:
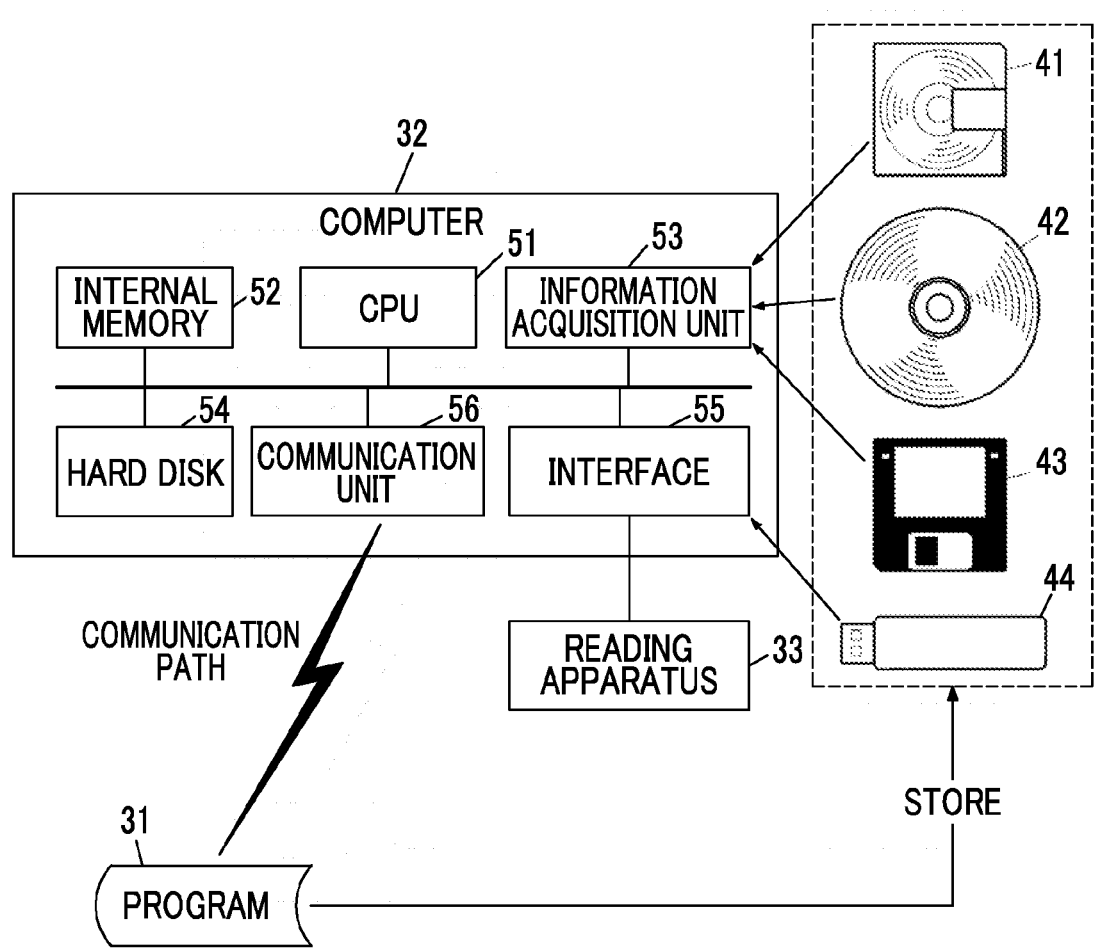
FIG. 4 is an explanatory view of an example of a computer program at the time of realizing a function described in the exemplary embodiment of the invention by the computer program, a non-transitory computer readable medium storing the computer program, and a computer.

FIG. 4 is an explanatory view of an example of a computer program at the time of realizing a function described in the exemplary embodiment of the invention by the computer program, a non-transitory computer readable medium storing the computer program, and a computer. In FIG. 4, "31" is a program, "32" is a computer, "33" is a reading apparatus, "41" is a magneto-optical disc, "42" is an optical disc, "43" is a magnetic disk, "44" is a memory, "51" is a CPU, "52" is an internal memory, "53" is an information acquisition unit, "54" is a hard disk, "55" is an interface, and "56" is a communication unit.

Functions of the coefficient matrix calculating section 5, the correction unit 7, the pretreatment unit 4, or the like described in the exemplary embodiment of the invention described above may be wholly or partially real iced by the program 31 which is executed by the computer. In this case, the program 31, data used by the program, and the like may be stored in the storage medium which is read by the computer. The storage medium causes a changing state of energy such as magnetism, light, and electricity with respect to the information acquisition unit 53 provided in a hardware resource of the computer according to contents of the program, and conveys the contents of the program to the information acquisition unit 53 in a signal form corresponding to this. For example, the magneto-optical disc 41, the optical disc 42 (including a CD, a DVD, or the like), the magnetic dish 43, the memory 44 (including an IC card, a memory card, a flash memory, or the like), and the like are included. Of course, the storage medium is not limited to a portable type storage medium.

The program 31 is stored in the storage medium, for example, the storage medium is mounted on the information acquisition unit 53 or the interface 55 of the computer 32, the program 31 is read from the computer and is stored in the internal memory 52 or the hard disk 54 (including a magnetic disk, a silicon disk, or the like), and the program 31 is executed by the CPU 51, and thus the functions of the coefficient matrix calculating section 5, the correction unit 7, the pretreatment unit 4, or the like described as the exemplary embodiment of the invention described above are wholly or partially realized. Alternatively, the program 31 may be transmitted to the computer 32 through a communication path, and in the computer 32, the program 31 may be received by the communication unit 56 and may be stored in the internal memory 52 or the hard disk 54, and the program 31 may be executed by the CPU 51 to be realized.

Furthermore, the reading apparatus 33 is connected to the interface 55 and performs the reading of the reference color or the reading of the image. The reading apparatus 33 includes the light irradiation portion 1, the optical unit 2, and the reading unit 3 illustrated in FIGS. 1A and 1B, and may include the pretreatment unit 4 as hardware. As the reading method, various methods described in FIGS. 1A and 1B and FIGS. 3A to 3C are applied. In addition, the coefficient matrix storage unit 6 may be configured by the internal memory 52 or the hard disk 54.

In addition, various apparatuses may be connected to the computer 32 through the interface 55. For example, an output apparatus may be connected through the interface 55, and an image may be configured to output from the output apparatus based on the image in which the correction process is performed. In addition, for example, a receiving unit for receiving information or the like may be connected. Furthermore, it is not necessary that each configuration be operated by one computer, but for example, the computer may be separate computers such as a computer for realizing the function of the coefficient matrix calculating section 5, and a computer for realizing the function of the correction unit 7.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners stilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reader, comprising:
a reading unit that reads an image of a read body;
an optical unit that forms the image of the read body on the reading unit;
a filter unit that is disposed in the optical unit and eliminates infrared light by an interference film;
a calculating unit that calculates a coefficient matrix based on a reading position of the reading unit and spectral field angle characteristics of the filter unit in the reading position; and
a correction unit that performs color correction with respect to the image read by the reading unit using the coefficient matrix.

2. The image reader according to claim 1,
wherein the calculating unit calculates the coefficient matrix using a value of a signal of each color component during reading a reference color plate as the read body by the reading unit together.

3. A non-transitory computer readable medium storing an image reading program causing a computer to execute:
a calculate function that calculates a coefficient matrix based on a reading position of a reading unit for reading an image of a read body through an optical unit provided with a filter unit with an interference film for eliminating infrared light and spectral field angle characteristics of the filter unit in the reading position; and a correct function that performs color correction with respect to the image read by the reading unit using the coefficient matrix.

\* \* \* \* \*